Nov. 29, 1966 I. J. P. JAMES ETAL 3,288,921

TELEVISION CAMERA INCLUDING MEANS FOR VARYING THE DEPTH OF FOCUS

Filed Oct. 28, 1963

United States Patent Office 3,288,921

Patented Nov. 29, 1966

3,288,921

TELEVISION CAMERA INCLUDING MEANS FOR VARYING THE DEPTH OF FOCUS

Ivanhoe John Penfound James, Ealing, London, and Denis Gordon Perkins, Gerrards Cross, England, assignors to Electric & Musical Industries Limited, Hayes, England, a British company Filed Oct. 28, 1963, Ser. No. 319,401
Claims priority, application Great Britain, Nov. 9, 1962, 42,516/62
5 Claims. (Cl. 178—5.4)

Figures 1, 2:
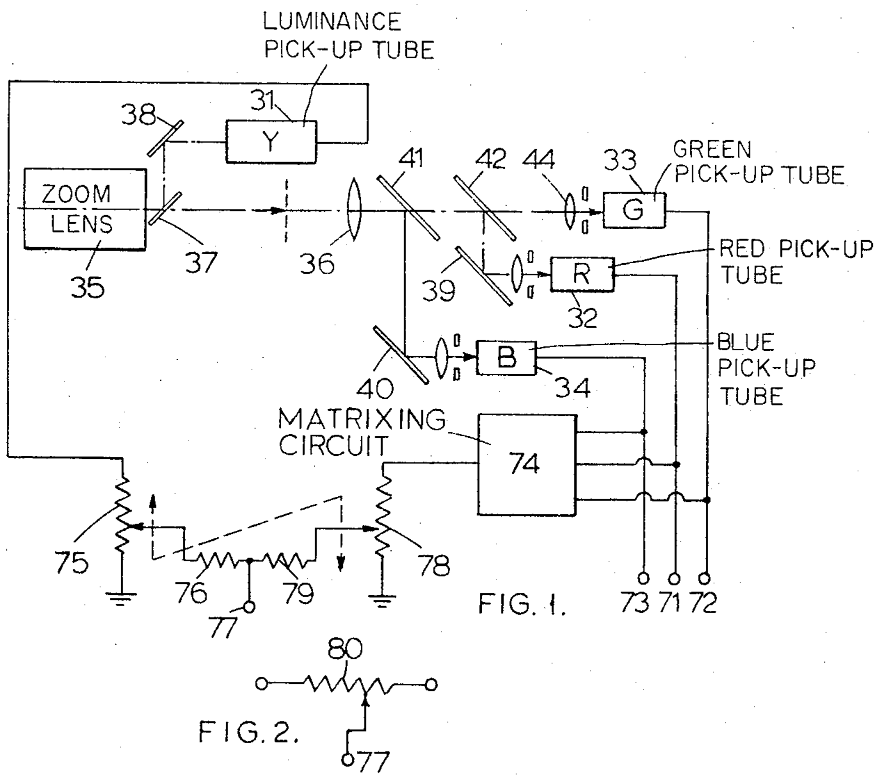

The invention relates to colour television camera arrangements.

Recently, proposals have been made for the arrangement of colour television cameras so as to have a luminance pick-up tube for generating a signal representing the luminance of an object, and one or more than one colour pick-up tube for generating signals representing colour components of the object. Cameras of this construction have certain advantages, among them the advantage that the luminance signal is obtained from a single pick-up tube and does not therefore exhibit errors which may arise from mis-registration of a plurality of colour pick-up tubes. A variety of camera arrangements embodying a seperate luminance pick-up tube are described in the specification of copending United States application Serial No. 298,517, filed on July 12, 1963, by I. J. P. James and H. G. Lubszynski, and the arrangements described in the specification of the said copending application incorporate an optical system for applying light to the respective tubes, which system is such that an optical image of greater depth of focus and thus of better resolution can be formed on the target of the luminance pick-up tube than on the target of the or each colour pick-up tube. The last mentioned arrangements are based on the consideration that if a separate luminance pick-up tube is employed only that tube need be capable of operation at an effective aperture corresponding to or exceeding a predetermined depth of focus, since only the output signal of the luminance pick-up tube being mainly responsible for the sharpness of the reproduced picture, need have the full video bandwidth. Each other pick-up tube in the camera can be operated with a greater effective aperture, so that in effect light rays of relatively "low quality" may be used such as could not be applied to the luminance pick-up tube at least when a substantial depth of focus is required. The application of low quality light rays to each colour pick-up tube will not impair the reproduced picture quality, provided the resolution which is obtained in the colour component images formed at the targets of the colour pick-up tubes is consistent with the bandwidth allotted to the colour component signals, which is related, as is known, to the ability of the eye to resolve picture elements of different colours. By virtue of arrangements described in the specification of the aforesaid application, more light can be made available for division among the various pick-up tubes of the camera.

In most cameras it is essential to provide means for adjusting the depth of focus, so that different artistic and other effects may be achieved. Variations of depth of focus are usually achieved by adjusting the effective aperture of the camera. However, in camera arrangements such as described in the preceding paragraph, the possibility arises of producing the effect of adjusting the depth of focus in other ways, with special advantage. Therefore one object of the present invention is to provide an improved colour television arrangement having novel means for producing the effect of adjusting the depth of focus.

According to the present invention there is provided a colour television camera arrangement comprising a luminance pick-up tube for generating a signal representing the luminance of an object, means including at least one other pick-up tube for generating a second signal representing the luminance of said object, an optical system for applying light to said tubes, said system including means to select axial rays to form an image on the target of said luminance pick-up tube and to select marginal rays to form an image on the target of said other pick-up tube, and control means for combining the two luminance signals in different proportion to produce a resultant luminance signal which effectively relates to an image of said object the depth of focus of which is variable in response to said control means.

A more general object of the invention is to provide an improved television camera arrangement having novel means for producing the effect of adjusting the depth of focus.

According to the present invention from another aspect there is provided a television camera arrangement comprising a luminance pick-up tube for generating a signal representing the luminance of an object, further means including at least one further pick-up tube for generating a signal representing the luminance of the object, said second signal effectively relating to an image of said object having a different depth of focus from the image of said object to which said first luminance signal relates, and control means for combining the two luminance signals to produce a resultant luminance signal which effectively relates to an image of said object the depth of focus of which is variable in response to said control means.

In order that the invention may be clearly understood and readily carried into effect it will now be described with reference to the accompanying drawings, in which:

FIGURE 1 illustrates diagrammatically a colour television camera arrangement according to one example of the present invention, the arrangement including means for giving the effect of varying the depth of focus without adjustment of the aperture of the camera, and FIGURE 2 shows a modification which may be made in the arrangement illustrated in FIGURE 1.

Referring to the drawing, FIGURE 1 illustrates a four tube colour television camera, one of the tubes of which is a luminance pick-up tube for generating the signal representing the luminance of an object and the three others of which tubes are colour pick-up tubes. In the example illustrated, the luminance pick-up tube 31 is a 4½ inch image orthicon tube and the three colour pick-up tubes 32, 33 and 34 are 1 inch vidicon tubes which respectively produce signal outputs representing the red, green and blue components. The camera may for example be used with transmitting apparatus which transmits a video waveform including components denoted by the symbols $Y^{1/\gamma}$, $R^{1/\gamma}-Y^{1/\gamma}$, and $B^{1/\gamma}-Y^{1/\gamma}$. In practical forms of the camera represented in FIGURE 1 the three vidicon pick-up tubes 32, 33 and 34 may have their axes in a common horizontal plane and the image orthicon pick-up tube may be located above them. The axes of all the tubes, are however, represented as being in one common plane in the drawing. The camera has a zoom lens 35, for example of the kind known in the trade as the Varotol III, manufactured by Rank Taylor-Hobson Division of the Rank Organisation, Leicester, England. The back focus of the lens is approximately 12 inches and the axial beam from the exit aperture, after reflection by a mirror 37, which is equivalent to an $f/8$ aperture, is deflected by another mirror 38 before the entrance opening of the tube 31. The axis of the tube 31 is parallel to that of the zoom lens 35. The annular beam from the exit aperture of the lens 35 passes the mirror 37 without reflection and forms a real image shown by dotted lines about 12 inches away from the zoom lens and then is transferred by the transfer lens 36, which is an 8 inch lens, in the colour analysing section of the camera. This section of the camera comprises in addition to the tubes 32, 33 and 34 the reflecting mirrors 39 and 40, and dichroic mirrors 41 and 42. The mirror system directs the appropriate components of the incident light to the objective lenses 43, 44 and 45 of the respective vidicons, which lenses are $f/1.4$ lenses with focal lengths of 8 centimetres. The different focal lengths of the lenses 35, 43, 44 and 45 produce the images of the requisite sizes for the different tubes 31, 32, 33 and 34. A field lens may be placed at the real image plane to produce a more even field illumination of the colour tube targets, and a field mask at the position is useful in forming a sharp surround to the colour tube images to reduce tube effects. The mirror 37 is a front surface mirror of small dimension placed just behind the lens 35 so that the light fed to the luminance tube 31 is reflected by the surface of this small mirror. The dimensions of the mirror are approximately equivalent to the size of an $f/8$ aperture, so that the light fed into the luminance tube is gathered only from an axial zone of the objective lens 35 thereby ensuring the depth of focus required for the luminance detail in the reproduced picture. The lens 35 is, however, computed for operation with apertures up to about $f/4$ or higher and the normal iris 2 is operated at about this aperture. Light passing through the marginal zones of the objective can therefore pass to the colour section of the camera. It is a known characteristic of colour vision that the colour information can be a lower order of resolution or definition than the luminance information and therefore, if by reason of the fact that the marginal zones of a relatively wide aperture objective are used to form the images on the targets of the colour pick-up tubes the resolution of the colour component images is relatively poor for parts of the scene which are not precisely in focus, this does not produce any noticeable deterioration of the reproduced picture. Moreover, the light intensity which can be produced at the target of the tubes 32, 33 and 34 is such as to reduce lag to an acceptable level.

The arrangement illustrated in FIGURE 1 also incorporates means, operative at a remote point if desired, for giving the effect of adjusting the depth of focus of the camera without actual aperture adjustment at the camera. The effective aperture of the lense 35 as far as the luminance tube 31 is concerned is determined by the mirror 37 which as explained is smaller than the aperture of the lens 35 so that extra axial rays from the lens 35 may be applied to the colour analysing section including the colour pick-up tubes 32, 33 and 34. The colour component from the pick-up tubes 32 to 34 are derived by leads 71, 72 and 73 by which they are applied to a circuit (not shown) for generating the chrominance signal to be transmitted. The colour component signals are also applied to a matrixing circuit 74 arranged to produce a linear combination of the colour component signals in such proportion that the output of circuit 74 forms a second luminance signal of the same general form but having a lesser effective depth of focus than the luminance signal obtained directly from the pick-up tube 31. The circuit 74 may be of well known form. The luminance signal from 31 is applied across a potentiometer 75, the slider of which is connected via a resistor 76 to the output terminal 77 for the eventual luminance signal. The luminance signal of lessor depth of focus from the circuit 74 is applied across a second potentiometer 78 similar to 75, the slider of which is connected via resistor 79 to the aforesaid output terminal 77. The sliders of the potentiometers 75 and 78 are ganged together so that as the amount of luminance signal taken from the tube 31 is increased the amount taken from the circuit 74 is decreased and vice versa. In this way the effective depth of focus is varied whilst maintaining the level of the output luminance signal substantially constant. Gamma correction of the output luminance signal may be affected at some point after the terminal 77. Nevertheless non-linear amplifiers may be used to ensure that the two signals which are applied to the potentiometers 75 and 78 conform to the same relationship between light input and signal output.

As represented in FIGURE 2, the circuit components 75, 76, 78 and 79 may be replaced by a single potentiometer 80 connected directly to the output terminal of the luminance pick-up tube on the one hand and that of the circuit 74 on the other. The use of the simpler alternative shown in FIGURE 2 requires that the amplitude of the two luminance signals should be equal to avoid variations of the amplitude of the output luminance signal at the terminal 77.

In order to maintain very high frequency definition of the output signal in the arrangement shown in FIGURE 1 it may be desirable to connect a small condenser from the output terminal of the tube 31 directly to the output terminal 77 thereby to allow the high frequency components generated by the tube 31 to by-pass the potentiometer 70 or 80.

The invention is not of course, confined in its application to the particular camera arrangement illustrated in FIGURE 1, and it can be applied to the other camera arrangements described in the specification of the aforesaid co-pending application. Other modifications may also be made. For example, the second luminance signal, instead of being derived by a combination of the outputs of the colour pick-up tubes may be derived from yet another pick-up tube giving a Y signal directly, such tube receiving light from further beam splitting means operating either before or after the mirror corresponding to 37. Moreover, the lens assembly may be modified to permit ½" vidicon tubes to be used.

Two or more colour pick-up tubes and associated dichroic mirrors may if desired be replaced by a single tube having, in front, a colour filter in the form of a plurality of differently colour strips perpendicular to the line scanning direction. Different colour component signals can be derived from the output of such a tube by known methods.

It will moreover be understood that this invention is not in any way restricted to the kinds of pick-up tubes which are used although the invention is especially advantageous to the arrangements in which the tube such as 31 has a photo-electrically emissive target and the colour pick-up tubes have photo-conductive targets. The pick-up tubes may moreover be replaced by tubes having lead oxide photo-conductive targets. The invention may also be applied in some cases to monochrome television cameras.

Furthermore, a magenta filter (—G) may be placed around an outer annular zone of the entrance pupil of the camera arrangement.

What we claim is:

1. A colour television camera arrangement comprising a luminance pick-up tube for generating a signal representing the luminance of an object, means including at least one other pick-up tube for generating a second signal representing the luminance of said object, an optical system for applying light to said tubes, said system including means to select axial rays to form an image on the target of said luminance pick-up tube and to select marginal rays to form an image on the target of said other pick-up tube, and control means for combining the two luminance signals in different proportion to produce a resultant luminance signal which effectively relates to an image of said object the depth of focus of which is variable in response to said control means.

2. An arrangement according to claim 1, in which said means for generating the second luminance signal includes a plurality of colour tubes for generating signals representing colour components of the object, and a circuit for combining signals derived from said colour pick-up tubes.

3. An arrangement according to claim 1 in which said other pick-up tube is a single luminance pick-up tube.

4. An arrangement according to claim 1 in which said control means comprises means for attenuating the amplitude of the first luminance signal, means for attenuating the amplitude of the second luminance signal, said attenuating means being connected for concomitant operation so that the attenuations of the two signals are complementary, and means for adding the signals produced by said attenuating means.

5. A television camera arrangement comprising a luminance pick-up tube for generating a signal representing the luminance of an object, further means including at least one further pick-up tube for generating a signal representing the luminance of the object, said second signal effectively relating to an image of said object having a different depth of focus from the image of said object to which said first luminance signal relates, and control means for combining the two luminance signals to produce a resultant luminance signal which effectively relates to an image of said object the depth of focus of which is variable in response to said control means.

References Cited by the Examiner

UNITED STATES PATENTS 2,831,057 4/1958 Orthuber ........... 178—7.92

DAVID G. REDINBAUGH, *Primary Examiner.*

J. A. O'BRIEN, *Assistant Examiner.*